United States Patent
Håkansson et al.

(10) Patent No.: US 10,202,996 B2
(45) Date of Patent: *Feb. 12, 2019

(54) MECHANICAL LOCKING SYSTEM FOR BUILDING PANELS

(71) Applicant: VÄLINGE INNOVATION AB, Viken (SE)

(72) Inventors: Niclas Håkansson, Viken (SE); Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/379,791

(22) Filed: Dec. 15, 2016

(65) Prior Publication Data

US 2017/0097033 A1    Apr. 6, 2017

Related U.S. Application Data

(63) Continuation of application No. 14/515,988, filed on Oct. 16, 2014, now Pat. No. 9,538,842, which is a
(Continued)

(51) Int. Cl.
*F16B 12/12* (2006.01)
*E04B 1/61* (2006.01)
(Continued)

(52) U.S. Cl.
CPC ........ *F16B 12/125* (2013.01); *A47B 47/0066* (2013.01); *A47B 47/0075* (2013.01);
(Continued)

(58) Field of Classification Search
CPC ... A47B 55/00; A47B 96/066; A47B 47/0066; A47B 47/0075; A47B 47/042;
(Continued)

(56) References Cited

U.S. PATENT DOCUMENTS 291,032 A      1/1884  Cleland
634,581 A  *  10/1899  Miller ............... F16B 21/18
                                                              403/327
(Continued)

FOREIGN PATENT DOCUMENTS

CH       685 276 A5       5/1995
CH       696889 A5  *    1/2008  ......... F16B 5/0614
(Continued)

OTHER PUBLICATIONS

U.S. Appl. No. 14/158,165, filed Jan. 17, 2014, Peter Derelöv, (Cited herein as US Patent Application Publication No. 2015/0078819 A1 of Mar. 19, 2015).
(Continued)

*Primary Examiner* — Ryan D Kwiecinski
(74) *Attorney, Agent, or Firm* — Buchanan Ingersoll & Rooney P.C.

(57) ABSTRACT

Panels are shown which are provided with a mechanical locking system allowing perpendicular connection with a snap action. A set of panels including a first and a second panel, an edge of the second panel is insertable into a groove of the first panel, when the panels are arranged essential perpendicular to each other, to obtain a mechanical connection between the first and the second panel, when the second panel is displaced essentially perpendicularly to the first panel.

20 Claims, 11 Drawing Sheets

Related U.S. Application Data continuation of application No. 13/464,512, filed on May 4, 2012, now Pat. No. 8,887,468.

(60) Provisional application No. 61/483,444, filed on May 6, 2011.

(51) Int. Cl.
| | |
|---|---|
| *A47B 47/00* | (2006.01) |
| *F16B 5/06* | (2006.01) |
| *F16B 12/26* | (2006.01) |
| *F16B 12/44* | (2006.01) |
| *A47B 88/90* | (2017.01) |

(52) U.S. Cl.
CPC .......... *A47B 88/941* (2017.01); *E04B 1/6141* (2013.01); *F16B 5/0614* (2013.01); *F16B 12/26* (2013.01); *F16B 12/44* (2013.01); *E04B 2001/6195* (2013.01); *E04F 2201/0523* (2013.01); *E04F 2201/0535* (2013.01); *Y10T 403/73* (2015.01)

(58) Field of Classification Search
CPC ...... E04F 2201/0523; E04F 2201/0535; E04F 2201/0138; E04F 2201/0146; F16B 12/24; F16B 12/26; F16B 5/0056; Y10T 403/73; Y10T 403/7096
See application file for complete search history.

(56) References Cited

U.S. PATENT DOCUMENTS

| | | | | |
|---|---|---|---|---|
| 701,000 | A | | 5/1902 | Ahrens |
| 861,911 | A | * | 7/1907 | Stewart ................. A47B 47/03 312/263 |
| 881,673 | A | * | 3/1908 | Ellison ..................... B65D 9/32 217/65 |
| 1,534,468 | A | | 4/1925 | Shea, Jr. |
| 1,954,242 | A | * | 4/1934 | Heppenstall ......... A47B 47/042 403/381 |
| 2,360,451 | A | | 10/1944 | Stone |
| 2,362,904 | A | * | 11/1944 | Kramer .................... F16B 12/24 16/270 |
| 2,496,184 | A | * | 1/1950 | Von Canon .......... A47B 88/941 144/354 |
| 3,195,968 | A | * | 7/1965 | Freeman ............... A47B 47/042 217/65 |
| 3,284,152 | A | * | 11/1966 | Schorghuber ...... A47B 47/0041 312/257.1 |
| 3,347,610 | A | * | 10/1967 | Pilliod ................... A47B 47/04 312/108 |
| 3,410,441 | A | * | 11/1968 | Rhyne ................... A47B 88/941 220/4.28 |
| 3,722,704 | A | | 3/1973 | Piretti |
| 3,722,971 | A | | 3/1973 | Zeischegg |
| 3,784,271 | A | | 1/1974 | Schreiber |
| 3,885,845 | A | * | 5/1975 | Krieks ................. A47B 47/042 312/108 |
| 4,089,614 | A | * | 5/1978 | Harley .................... F16B 12/16 312/195 |
| 4,099,887 | A | | 7/1978 | Mackenroth |
| 4,116,510 | A | * | 9/1978 | Franco ................. F16B 5/0291 220/4.01 |
| 4,142,271 | A | | 3/1979 | Busse |
| 4,279,397 | A | | 7/1981 | Larsson |
| 4,509,648 | A | | 4/1985 | Govang |
| 4,597,122 | A | | 7/1986 | Handler |
| 4,750,794 | A | | 6/1988 | Vegh |
| 4,752,150 | A | | 6/1988 | Salice |
| 4,883,331 | A | * | 11/1989 | Mengel ................. A47B 13/003 312/195 |
| 4,886,326 | A | * | 12/1989 | Kuzyk ................ A47B 47/0041 312/257.1 |
| 4,909,581 | A | * | 3/1990 | Haheeb ................. A47B 88/941 312/263 |
| 5,004,116 | A | | 4/1991 | Cattarozzi |
| 5,114,265 | A | | 5/1992 | Grisley |
| 5,209,556 | A | | 5/1993 | Anderson |
| 5,212,925 | A | | 5/1993 | McClinton |
| 5,360,121 | A | | 11/1994 | Sothman |
| 5,475,960 | A | * | 12/1995 | Lindal ................... E04B 1/0007 52/222 |
| 5,499,886 | A | | 3/1996 | Short et al. |
| 5,527,103 | A | * | 6/1996 | Pittman ................. A01K 63/006 217/12 R |
| 5,658,086 | A | * | 8/1997 | Brokaw ............... A47B 13/003 144/354 |
| 5,893,617 | A | * | 4/1999 | Lee ..................... A47B 47/0041 312/263 |
| 5,950,389 | A | * | 9/1999 | Porter ................... E04B 1/6145 403/DIG. 15 |
| 6,413,007 | B1 | | 7/2002 | Lambright |
| 6,505,452 | B1 | | 1/2003 | Hannig |
| 6,675,979 | B2 | | 1/2004 | Taylor |
| 6,769,219 | B2 | | 8/2004 | Schwitte et al. |
| 6,827,028 | B1 | * | 12/2004 | Callaway .................. A47B 3/06 108/157.1 |
| 7,051,486 | B2 | | 5/2006 | Pervan |
| 7,451,535 | B2 | * | 11/2008 | Wells ................... A47B 47/042 29/412 |
| 7,451,578 | B2 | | 11/2008 | Hannig |
| 7,454,875 | B2 | | 11/2008 | Pervan et al. |
| 7,584,583 | B2 | * | 9/2009 | Bergelin ................ E04F 15/02 52/588.1 |
| 7,621,092 | B2 | * | 11/2009 | Groeke .................. E04F 15/02 52/582.1 |
| 7,634,884 | B2 | | 12/2009 | Pervan |
| 7,637,068 | B2 | | 12/2009 | Pervan |
| 7,641,414 | B1 | | 1/2010 | Joyce |
| 7,677,005 | B2 | | 3/2010 | Pervan |
| 7,721,503 | B2 | | 5/2010 | Pervan et al. |
| 7,757,452 | B2 | | 7/2010 | Pervan |
| 7,802,411 | B2 | | 9/2010 | Pervan |
| 7,818,939 | B2 | | 10/2010 | Bearinger |
| 7,841,144 | B2 | | 11/2010 | Pervan et al. |
| 7,841,145 | B2 | | 11/2010 | Pervan et al. |
| 7,841,150 | B2 | | 11/2010 | Pervan |
| 7,861,482 | B2 | | 1/2011 | Pervan et al. |
| 7,866,110 | B2 | | 1/2011 | Pervan |
| 7,908,815 | B2 | | 3/2011 | Pervan et al. |
| 7,930,862 | B2 | | 4/2011 | Bergelin et al. |
| 7,980,041 | B2 | | 7/2011 | Pervan |
| 7,998,549 | B2 | * | 8/2011 | Susnjara ............... A47B 47/042 29/428 |
| 8,033,074 | B2 | | 10/2011 | Pervan |
| 8,038,363 | B2 | | 10/2011 | Hannig |
| 8,042,311 | B2 | * | 10/2011 | Pervan .................... E04F 15/02 52/586.1 |
| 8,061,104 | B2 | | 11/2011 | Pervan |
| 8,079,196 | B2 | | 12/2011 | Pervan |
| 8,112,967 | B2 | | 2/2012 | Pervan et al. |
| 8,171,692 | B2 | | 5/2012 | Pervan |
| 8,181,416 | B2 | | 5/2012 | Pervan et al. |
| 8,220,217 | B2 | | 7/2012 | Muehlebach |
| 8,234,830 | B2 | | 8/2012 | Pervan et al. |
| 8,341,914 | B2 | | 1/2013 | Pervan et al. |
| 8,341,915 | B2 | | 1/2013 | Pervan et al. |
| 8,353,140 | B2 | | 1/2013 | Pervan et al. |
| 8,359,805 | B2 | | 1/2013 | Pervan et al. |
| 8,365,499 | B2 | | 2/2013 | Nilsson et al. |
| 8,381,477 | B2 | | 2/2013 | Pervan et al. |
| 8,387,327 | B2 | * | 3/2013 | Pervan .................... E04F 15/02 52/586.2 |
| 8,448,402 | B2 | | 5/2013 | Pervan et al. |
| 8,495,849 | B2 | | 7/2013 | Pervan |
| 8,499,521 | B2 | | 8/2013 | Pervan et al. |
| 8,505,257 | B2 | | 8/2013 | Boo et al. |
| 8,528,289 | B2 | | 9/2013 | Pervan et al. |
| 8,544,230 | B2 | | 10/2013 | Pervan |
| 8,544,234 | B2 | | 10/2013 | Pervan et al. |
| 8,572,922 | B2 | | 11/2013 | Pervan |

(56) References Cited

U.S. PATENT DOCUMENTS

| | | |
|---|---|---|
| 8,596,013 B2 | 12/2013 | Boo |
| 8,615,952 B2 | 12/2013 | Engström |
| 8,627,862 B2 | 1/2014 | Pervan et al. |
| 8,640,424 B2 | 2/2014 | Pervan et al. |
| 8,650,626 B2 | 2/2014 | Pervan et al. |
| 8,677,714 B2 | 3/2014 | Pervan |
| 8,689,512 B2 | 4/2014 | Pervan |
| 8,707,650 B2 | 4/2014 | Pervan |
| 8,713,886 B2 | 5/2014 | Boo et al. |
| 8,733,065 B2 | 5/2014 | Pervan |
| 8,733,410 B2 | 5/2014 | Pervan |
| 8,745,952 B2 | 6/2014 | Perra |
| 8,763,341 B2 | 7/2014 | Pervan |
| 8,764,137 B2 | 7/2014 | Fehre |
| 8,769,905 B2 | 7/2014 | Pervan |
| 8,776,473 B2 | 7/2014 | Pervan et al. |
| 8,833,028 B2 | 9/2014 | Whispell et al. |
| 8,844,236 B2 | 9/2014 | Pervan et al. |
| 8,857,126 B2 | 10/2014 | Pervan et al. |
| 8,887,468 B2 | 11/2014 | Håkansson et al. |
| 8,898,988 B2 | 12/2014 | Pervan |
| 9,175,703 B2 * | 11/2015 | Maertens .............. A47B 47/042 |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,809,983 B2 | 11/2017 | Trudel |
| 9,945,121 B2 | 4/2018 | Derelöv |
| 10,034,541 B2 | 7/2018 | Boo et al. |
| 2002/0170258 A1 | 11/2002 | Schwitte et al. |
| 2004/0016196 A1 | 1/2004 | Pervan |
| 2005/0160694 A1 | 7/2005 | Pervan |
| 2005/0210810 A1 | 9/2005 | Pervan |
| 2006/0070333 A1 | 4/2006 | Pervan |
| 2006/0101769 A1 * | 5/2006 | Pervan .............. E04F 15/02 52/591.1 |
| 2006/0236642 A1 | 10/2006 | Pervan |
| 2006/0260254 A1 | 11/2006 | Pervan et al. |
| 2006/0273085 A1 | 12/2006 | Casto |
| 2007/0006543 A1 | 1/2007 | Engström |
| 2008/0000186 A1 | 1/2008 | Pervan et al. |
| 2008/0000187 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan |
| 2008/0134613 A1 | 6/2008 | Pervan |
| 2008/0134614 A1 | 6/2008 | Pervan |
| 2008/0155930 A1 | 7/2008 | Pervan et al. |
| 2008/0216434 A1 | 9/2008 | Pervan |
| 2008/0216435 A1 | 9/2008 | Nolan |
| 2008/0216920 A1 | 9/2008 | Pervan |
| 2008/0236088 A1 * | 10/2008 | Hannig .............. B27M 3/0066 52/592.1 |
| 2008/0295432 A1 | 12/2008 | Pervan et al. |
| 2009/0064624 A1 | 3/2009 | Sokol |
| 2009/0133353 A1 | 5/2009 | Pervan et al. |
| 2009/0193748 A1 | 8/2009 | Boo et al. |
| 2010/0083603 A1 * | 4/2010 | Goodwin .............. E04F 15/02 52/589.1 |
| 2010/0173122 A1 * | 7/2010 | Susnjara .............. A47B 47/042 428/119 |
| 2010/0289389 A1 | 11/2010 | Crabtree, II |
| 2010/0293879 A1 | 11/2010 | Pervan et al. |
| 2010/0300031 A1 | 12/2010 | Pervan et al. |
| 2010/0319290 A1 | 12/2010 | Pervan |
| 2010/0319291 A1 | 12/2010 | Pervan et al. |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0154763 A1 | 6/2011 | Bergelin et al. |
| 2011/0167750 A1 | 7/2011 | Pervan |
| 2011/0225921 A1 * | 9/2011 | Schulte .............. E04F 15/02 52/588.1 |
| 2011/0225922 A1 * | 9/2011 | Pervan .............. E04F 13/0894 52/588.1 |
| 2011/0252733 A1 | 10/2011 | Pervan |
| 2011/0280655 A1 | 11/2011 | Maertens |
| 2011/0283650 A1 * | 11/2011 | Pervan .............. E04F 15/02 52/588.1 |
| 2012/0009383 A1 | 1/2012 | Hardesty |
| 2012/0017533 A1 | 1/2012 | Pervan et al. |
| 2012/0027967 A1 | 2/2012 | Maertens |
| 2012/0031029 A1 | 2/2012 | Pervan et al. |
| 2012/0036804 A1 | 2/2012 | Pervan |
| 2012/0073235 A1 * | 3/2012 | Hannig .............. B27M 3/0066 52/588.1 |
| 2012/0124932 A1 | 5/2012 | Schulte et al. |
| 2012/0145845 A1 | 6/2012 | Hightower |
| 2012/0151865 A1 | 6/2012 | Pervan et al. |
| 2012/0174515 A1 | 7/2012 | Pervan |
| 2012/0174520 A1 | 7/2012 | Pervan |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0008117 A1 | 1/2013 | Pervan |
| 2013/0014463 A1 | 1/2013 | Pervan |
| 2013/0019555 A1 | 1/2013 | Pervan |
| 2013/0042562 A1 | 2/2013 | Pervan |
| 2013/0042563 A1 | 2/2013 | Pervan |
| 2013/0042564 A1 | 2/2013 | Pervan et al. |
| 2013/0042565 A1 | 2/2013 | Pervan |
| 2013/0047536 A1 | 2/2013 | Pervan |
| 2013/0048632 A1 | 2/2013 | Chen |
| 2013/0071172 A1 | 3/2013 | Maertens et al. |
| 2013/0081349 A1 | 4/2013 | Pervan et al. |
| 2013/0097846 A1 | 4/2013 | Pettigrew |
| 2013/0111845 A1 | 5/2013 | Pervan |
| 2013/0145708 A1 | 6/2013 | Pervan |
| 2013/0160391 A1 | 6/2013 | Pervan et al. |
| 2013/0170904 A1 | 7/2013 | Cappelle et al. |
| 2013/0232905 A2 | 9/2013 | Pervan |
| 2013/0239508 A1 | 9/2013 | Pervan et al. |
| 2013/0263454 A1 | 10/2013 | Boo et al. |
| 2013/0263547 A1 | 10/2013 | Boo |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0033634 A1 | 2/2014 | Pervan |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0111076 A1 | 4/2014 | Devos |
| 2014/0123586 A1 | 5/2014 | Pervan et al. |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0305065 A1 | 10/2014 | Pervan |
| 2014/0366476 A1 | 12/2014 | Pervan |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Derelöv |
| 2016/0007751 A1 | 1/2016 | Derelöv |
| 2016/0174704 A1 | 6/2016 | Boo et al. |
| 2016/0270531 A1 | 9/2016 | Derelöv |

(56) References Cited

U.S. PATENT DOCUMENTS

| | | |
|---|---|---|
| 2017/0079433 A1 | 3/2017 | Derelöv et al. |
| 2017/0089379 A1 | 3/2017 | Pervan |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |

FOREIGN PATENT DOCUMENTS

| | | | |
|---|---|---|---|
| CH | 696889 A5 * | 1/2008 | ............ F16B 5/0614 |
| CH | 698 988 B1 | 12/2009 | |
| CN | 203424576 U | 2/2014 | |
| DE | 26 35 237 A | 2/1978 | |
| DE | 20 2008 011 589 U1 | 11/2008 | |
| DE | 20 2009 008 825 U1 | 10/2009 | |
| DE | 10 2009 041 142 A1 | 3/2011 | |
| DE | 10 2014 110 124 A1 | 1/2016 | |
| EP | 0 362 968 A | 4/1990 | |
| EP | 0 675 332 A2 | 10/1995 | |
| EP | 0 871 156 A2 | 10/1998 | |
| EP | 1 048 423 A2 | 11/2000 | |
| EP | 1 048 423 B9 | 5/2005 | |
| EP | 1 650 375 A1 | 4/2006 | |
| EP | 1 671 562 A1 | 6/2006 | |
| EP | 1 650 375 A8 | 9/2006 | |
| EP | 1 863 984 A1 | 12/2007 | |
| EP | 1 922 954 A1 | 5/2008 | |
| EP | 2 017 403 A2 | 1/2009 | |
| EP | 2 037 128 A1 | 3/2009 | |
| EP | 1 922 954 B1 | 7/2009 | |
| EP | 2 333 353 A2 | 6/2011 | |
| EP | 1 863 984 B1 | 11/2011 | |
| EP | 2 487 373 A1 | 8/2012 | |
| EP | 3 031 998 A1 | 6/2016 | |
| FR | 2 062 731 A5 | 6/1971 | |
| FR | 2 517 187 A1 | 6/1983 | |
| GB | 1 022 377 A | 3/1966 | |
| GB | 2 482 213 A | 1/2012 | |
| JP | 2003-239921 A | 8/2003 | |
| KR | 10-1147274 B1 | 5/2012 | |
| KR | 2014-0042314 A | 4/2014 | |
| WO | WO 87/07339 A1 | 12/1987 | |
| WO | WO 99/22150 A1 | 5/1999 | |
| WO | WO 00/66856 A1 | 11/2000 | |
| WO | WO 01/02669 A1 | 1/2001 | |
| WO | WO 01/02670 A1 | 1/2001 | |
| WO | WO 01/51733 A1 | 7/2001 | |
| WO | WO 01/53628 A1 | 7/2001 | |
| WO | WO 02/055809 A1 | 7/2002 | |
| WO | WO 02/055810 A1 | 7/2002 | |
| WO | WO 03/016654 A1 | 2/2003 | |
| WO | WO 03/027510 A2 | 4/2003 | |
| WO | WO 03/083234 A1 | 10/2003 | |
| WO | WO 2004/079130 A1 | 9/2004 | |
| WO | WO 2005/068747 A1 | 7/2005 | |
| WO | WO 2006/043893 A1 | 4/2006 | |
| WO | WO 2006/103500 A1 | 10/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2008/004960 A2 | 1/2008 | |
| WO | WO 2008/004960 A8 | 1/2008 | |
| WO | WO 2008/017281 A1 | 2/2008 | |
| WO | WO 2008/017301 A2 | 2/2008 | |
| WO | WO 2008/017301 A3 | 2/2008 | |
| WO | WO 2008/150234 A1 | 12/2008 | |
| WO | WO 2010/023042 A1 | 3/2010 | |
| WO | WO 2010/070472 A2 | 6/2010 | |
| WO | WO 2010/070472 A3 | 6/2010 | |
| WO | WO 2010/070605 A2 | 6/2010 | |
| WO | WO 2010/070605 A3 | 6/2010 | |
| WO | WO 2010/082171 A2 | 7/2010 | |
| WO | WO 2010/087752 A1 | 8/2010 | |
| WO | WO 2011/012104 A2 | 2/2011 | |
| WO | WO 2011/012104 A3 | 2/2011 | |
| WO | WO 2011/085710 A1 | 7/2011 | |
| WO | WO 2011/151737 A2 | 12/2011 | |
| WO | WO 2011/151737 A3 | 12/2011 | |
| WO | WO 2011/151737 A9 | 12/2011 | |
| WO | WO 2011/151758 A2 | 12/2011 | |
| WO | WO 2011/151758 A3 | 12/2011 | |
| WO | WO 2011151737 A2 * | 12/2011 | ............ A47B 47/042 |
| WO | WO-2011151737 A2 * | 12/2011 | ............ A47B 47/042 |
| WO | WO 2012/095454 A1 | 7/2012 | |
| WO | WO 2012/154113 A1 | 11/2012 | |
| WO | WO 2013/025163 A1 | 2/2013 | |
| WO | WO 2013/080160 A1 | 6/2013 | |
| WO | WO 2013/118075 A1 | 8/2013 | |
| WO | WO 2015/105450 A1 | 7/2015 | |
| WO | WO 2015/105451 A1 | 7/2015 | |

OTHER PUBLICATIONS

U.S. Appl. No. 14/486,681, filed Sep. 15, 2014, Hans Brännström, (Cited herein as US Patent Application Publication No. 2015/0078807 A1 of Mar. 19, 2015).

U.S. Appl. No. 14/573,473, filed Dec. 17, 2014, Peter Derelöv, (Cited herein as US Patent Application Publication No. 2015/0196118 A1 of Jul. 16, 2015).

U.S. Appl. No. 14/573,572, filed Dec. 17, 2014, Christian Boo, (Cited herein as US Patent Application Publication No. 2015/0198191 A1 of Jul. 16, 2015).

U.S. Appl. No. 14/972,949, filed Dec. 17, 2015, Christian Boo, (Cited herein as US Patent Application Publication No. 2016/0174704 A1 of Jun. 23, 2016).

U.S. Appl. No. 15/171,403, filed Jun. 2, 2016, Peter Derelöv, (Cited herein as US Patent Application Publication No. 2016/0270531 A1 of Sep. 22, 2016).

U.S. Appl. No. 15/271,622, filed Sep. 21, 2016, Peter Derelöv.

U.S. Appl. No. 15/308,872, filed Nov. 4, 2016, Darko Pervan.

U.S. Appl. No. 15/366,704, filed Dec. 1, 2016, Peter Derelöv.

U.S. Appl. No. 15/415,356, filed Jan. 25, 2017, Peter Derelöv.

U.S. Appl. No. 15/422,798, filed Feb. 2, 2017, Magnus Fridlund.

U.S. Appl. No. 15/428,469, filed Feb. 9, 2017, Magnus Fridlund.

U.S. Appl. No. 15/428,504, filed Feb. 9, 2017, Christian Boo.

U.S. Appl. No. 15/432,190, filed Feb. 14, 2017, Magnus Fridlund.

U.S. Appl. No. 15/432,190, Fridlund.

International Search Report dated Aug. 2, 2012 in PCT/SE2012/050475, Swedish Patent Office, Stockholm, Sweden, 8 pages.

Derelöv, Peter, et al., U.S. Appl. No. 15/271,622 entitled "Panels Comprising Mechanical Locking Device and an Assembled Product Comprising the Panels", filed in the U.S. Patent and Trademark Office on Sep. 21, 2016.

Pervan, Darko, U.S. Appl. No. 15/308,872 entitled "Mechanical Locking System for Building Panels," filed in the U.S. Patent and Trademark Office on Nov. 4, 2016.

Derelöv, Peter, U.S. Appl. No. 15/366,704 entitled "Panels Comprising a Mechanical Locking Device and an Assembled Product Comprising the Panels", filed in the U.S. Patent and Trademark Office on Dec. 1, 2016.

Derelöv, Peter, et al., U.S. Appl. No. 15/415,356 entitled "Panels Comprising a Mechanical Locking Device and an Assembled Product Comprising the Panels", filed in the U.S. Patent and Trademark Office on Jan. 25, 2017.

Fridlund, Magnus, U.S. Appl. No. 15/422,798 entitled "Set of Panels for an Assembled Product," filed in the U.S. Patent and Trademark Office on Feb. 2, 2017.

(56) References Cited

OTHER PUBLICATIONS

Fridlund, Magnus, U.S. Appl. No. 15/428,469 entitled "Element and Method for Providing Dismantling Groove," filed in the U.S. Patent and Trademark Office on Feb. 9, 2017.

Boo, Christian, U.S. Appl. No. 15/423,504 entitled "Set of Panel-Shaped Elements for a Composed Element," filed in the U.S. Patent and Trademark Office on Feb. 9, 2017.

Fridlund, Magnus, U.S. Appl. No. 15/432,190 entitled "Method for Forming a Panel," filed in the U.S. Patent and Trademark Office on Feb. 14, 2017.

U.S. Appl. No. 15/584,633, filed May 2, 2017, Christian Boo.

U.S. Appl. No. 15/642,757, filed Jul. 6, 2017, Peter Derelöv.

U.S. Appl. No. 15/646,714, filed Jul. 11, 2017, Peter Derelöv.

Extended European Search issued in EP Patent Application No. 12782144.5, dated Aug. 14, 2014, European Patent Office, Munich DE, 9 pages.

Boo, Christian, et al., U.S. Appl. No. 15/584,633 entitled "Panels Comprising a Mechanical Locking Device and an Assembled Product Comprising the Panels", filed in the U.S. Patent and Trademark Office on May 2, 2017.

Derelöv, Peter., U.S. Appl. No. 15/642,757 entitled "Panels Comprising a Mechanical Locking Device and an Assembled Product Comprising the Panels", filed in the U.S. Patent and Trademark Office on Jul. 6, 2017.

Derelöv, Peter, et al., U.S. Appl. No. 15/646,714 entitled "Assembled Product and a Method of Assembling the Product", filed in the U.S. Patent and Trademark Office on Jul. 11, 2017.

Fransson, Jonas, et al., U.S. Appl. No. 15/848,164 entitled "Device for Inserting a Tongue", filed in the U.S. Patent and Trademark Office on Dec. 20, 2017.

Derelöv, Peter, U.S. Appl. No. 15/923,701 entitled "Panels Comprising a Mechanical Locking Device and an Assembled Product Comprising the Panels", filed in the U.S. Patent and Trademark Office on Mar. 16, 2018.

U.S. Appl. No. 15/562,254, filed Sep. 27, 2017, Peter Derelöv.

U.S. Appl. No. 15/567,507, filed Oct. 18, 2017, Christian Boo, Peter Derelöv and Agne Pålsson.

U.S. Appl. No. 15/794,491, filed Oct. 26, 2017, Peter Derelöv.

Derelöv, Peter, U.S. Appl. No. 15/562,254 entitled "Panel with a Slider", filed in the U.S. Patent and Trademark Office on Sep. 27, 2017.

Boo, Christian, et al., U.S. Appl. No. 15/567,507 entitled "Panel With a Fastening Device," filed in the U.S. Patent and Trademark Office on Oct. 18, 2017.

Derelöv, Peter, U.S. Appl. No. 15/794,491 entitled "Set of Panels with a Mechanical Locking Device", filed in the U.S. Patent and Trademark Office on Oct. 26, 2017.

U.S. Appl. No. 15/848,164, filed Dec. 20, 2017, Jonas Fransson, Andreas Blomgren and Karl Erikson.

U.S. Appl. No. 15/923,701, filed Mar. 16, 2018, Peter Derelöv.

U.S. Appl. No. 15/956,949, filed Apr. 19, 2018, Peter Derelöv.

U.S. Appl. No. 15/978,630, filed May 14, 2018, Jonas Fransson, Niclas Håkansson and Agne Pålsson.

U.S. Appl. No. 16/027,479, filed Jul. 5, 2018, Christian Boo and Peter Derelöv.

U.S. Appl. No. 16/027,479, Boo, et al.

Extended European Search Report issued in EP Patent Application No. 17202290.7, dated Feb. 12, 2018, European Patent Office, Munich, DE, 10 pages.

Derelöv, Peter, U.S. Appl. No. 15/956,949 entitled "Panels for an Assembled Product", filed in the U.S. Patent and Trademark Office on Apr. 19, 2018.

Fransson, Jonas, et al., U.S. Appl. No. 15/978,630 entitled "Elements and a Locking Device for an Assembled Product," filed in the U.S. Patent and Trademark Office on May 14, 2018.

Boo, Christian, et al., U.S. Appl. No. 16/027,479 entitled "Panels Comprising a Mechanical Locking Device and an Assembled Product Comprising the Panels," filed in the U.S. Patent and Trademark Office on Jul. 5, 2018.

\* cited by examiner

MECHANICAL LOCKING SYSTEM FOR BUILDING PANELS

CROSS REFERENCE TO RELATED APPLICATIONS

The present application is a continuation of U.S. patent application Ser. No. 14/515,988, filed on Oct. 16, 2014, which claims the benefit of U.S. application Ser. No. 13/464,512, filed on May 4, 2012, which claims the benefit of U.S. Provisional Application No. 61/483,444, filed on May 6, 2011 and claims the benefit of Swedish Application No. 1150400-8, filed on May 6, 2011. The entire contents of each of U.S. Application Ser. No. 13/464,512, U.S. Provisional Application No. 61/483,444 and Swedish Application No. 1150400-8 are hereby incorporated herein by reference.

TECHNICAL FIELD

The disclosure relates to the field of mechanical locking systems for building panels, especially furniture components with mechanical locking systems, which are intended to lock preferably perpendicular to each other.

FIELD OF APPLICATION OF THE INVENTION

Embodiments of the present invention are particularly suitable for use in furniture components, which are preferably formed of sheet shaped panels and which are joined mechanically with a locking system integrated with the panel, i.e. mounted at the factory. The following description of known technology, problems of known systems and objects and features of the invention will therefore, as a non-restrictive example, be aimed above all at this field of application and in particular at furniture components formed as rectangular panels intended to be mechanically joined on one pair of opposite edges perpendicularly to other adjacent panels. The panels may also be square.

It should be emphasized that the invention can be applied to any type of sheet shaped panel such as for example wood based HDF, particle board and plywood, plastic sheet shaped materials, mineral fibre and metal based materials, stone and ceramics and similar. It may be used to connect furniture components, and elements for packaging boxes and similar. It may also be used to lock components, which for example have a cylinder form such as table legs.

BACKGROUND OF THE INVENTION

Furniture such as kitchen cabinets, bookshelves, drawers, tables and similar are generally supplied as flat components in order to save transportation costs. The customer must assemble them. Several methods are used to assemble such furniture components, for example, glue, spikes, screws and similar. Snapping connections comprising plastic components are widely used to connect, for example, drawers.w

Know Technology and Problems Thereof

There are a lot of problems connected with the assembly of furniture components especially when one panel should be connected perpendicularly to another panel. Generally special connection devices are supplied that have to be inserted into grooves and holes. Such assembly is complicated and time consuming and the connection is often not strong enough. Snapping connections formed in plastic materials are expensive and complicated to produce. It would be an advantage if assembly may be simplified and if no loose parts would be needed in order to connect panels to each other in a firm, cost efficient and rigid manner.

WO 2010/070472 describes locking systems that may be used to assemble furniture components with angling and snapping. The locking systems may be formed in one piece with the panel or, alternatively, a separate plastic tongue with an outer flexible snap tab may be used. Such locking systems do not give sufficient strength and rigidity especially when rather soft core materials, such as particleboard, are used. The locking system is complicated to produce since the flexible tongue cannot be connected to the components with a linear displacement into a groove. The outer flexible part is generally not strong enough to provide a rigid connection.

SUMMARY OF THE INVENTION

A basic objective of embodiments of the present invention is to provide an improved mechanical locking system which may be produced in a cost effective way and which allows preferably rectangular panels to be connected and assembled mechanically perpendicularly to each other with a strong locking and in a simple manner without the need for loose parts that has to be used during assembly.

The above objects of embodiments of the invention are achieved wholly or partly by mechanical locking systems and panels, according to the independent claim that provide a stronger and easier locking. Embodiments of the invention are evident from the dependent claims and from the description and drawings.

A first aspect of the invention is a set of panels comprising a first and a second panel. An edge of the second panel is insertable into a groove of the first panel, when the panels are arranged essential perpendicular to each other, to obtain a mechanical connection between the first and the second panel, when the second panel is displaced essentially perpendicularly to the first panel. The edge comprises a separate and flexible tongue and said groove comprises a tongue groove, or said edge comprises a tongue groove and said groove comprises a separate and flexible tongue. The separate and flexible tongue is insertable into the tongue groove for connecting said panels to each other in a first direction, which is parallel to a main plane of the first panel. The edge of the second panel is configured to cooperate with the groove of the first panel for connecting said panels to each other in a second direction, which is parallel to a main plane (MP) of the second panel. The length direction of the separate and flexible tongue extends parallel with said edge and/or groove. The groove preferably comprises an opening, two sidewalls and a bottom. The separate and flexible tongue is arranged in an insertion groove. The separate and flexible tongue has an inner part mounted in the insertion groove and an outer part extending outside an opening of the insertion groove. A part of the separate tongue is displaced in the insertion groove during locking. The flexible tongue is preferably displaceable inwardly towards a bottom of the insertion groove and outwardly into the tongue groove during locking.

The tongue may comprise two opposite displacement surfaces located between the inner and outer parts of the separate and flexible tongue. One or both of said two opposite displacement surfaces may be displaceable against a wall(s) of the insertion groove during locking.

A locking involving displacement of a displacement surface against an upper or lower wall of the insertion groove may make it possible use a tongue with a rigid outer part.

That may facilitate a strong locking even in rather soft materials such a particle boards that are often used a base material in furniture components. The outer rigid part may be displaced into a rather deep tongue groove and a firm locking may be obtained.

Said insertion groove may be inclined upwards with the opening closer to the main plane of the panel than the inner part of the insertion groove. Such inclination may facilitate the insertion of the separate tongue into the insertion groove during production since the tongue may be inserted with a linear motion into the displacement groove.

The separate and flexible tongue may, when the edge of the second panel is inserted into the groove of the first panel, lock by snapping.

The inner part may be fixed in the insertion groove by e.g. friction connection or by glue.

The inner part of the tongue may comprise one or several flexible protrusions extending in the length direction of the tongue.

The first and/or the second panel may comprise separate materials that form an edge or a groove portion. A particleboard panel may be reinforced with solid wood, plywood, HDF and similar wood based materials that are glued or mechanically connected to the panels in order to form at least a part of the locking system.

The second panel may have an outer edge with a smaller thickness than the thickness of the panel body such that the panel body overlaps one or both parts of the groove opening when the second panel is inserted into the groove of the first panel.

At least a part of the tongue and/or the groove may be formed in the first and the second panel respectively before a part of the tongue and/or the groove, and preferably a part of the panel, may be covered by a layer, such as a foil.

The above-described locking system allows that panels may be locked automatically perpendicularly to each other with a snap action and without any loose parts. The flexible tongue provides a strong and easy locking in middle sections and in corner sections.

The tongue is preferably factory connected but it may of course be delivered separately in blanks or as a separate loose component and inserted into a groove during installation.

The panels may not be only connectable perpendicular to each other but may also be connectable to each other at an angle of less than 180° between the main planes of the first and the second panel or preferably in the range of about 45° to about 135°.

DESCRIPTION OF EMBODIMENTS OF THE INVENTION

To facilitate understanding, several locking systems in the figures are shown schematically. It should be emphasized that improved or different functions can be achieved using combinations of the preferred embodiments.

Figure 1A:
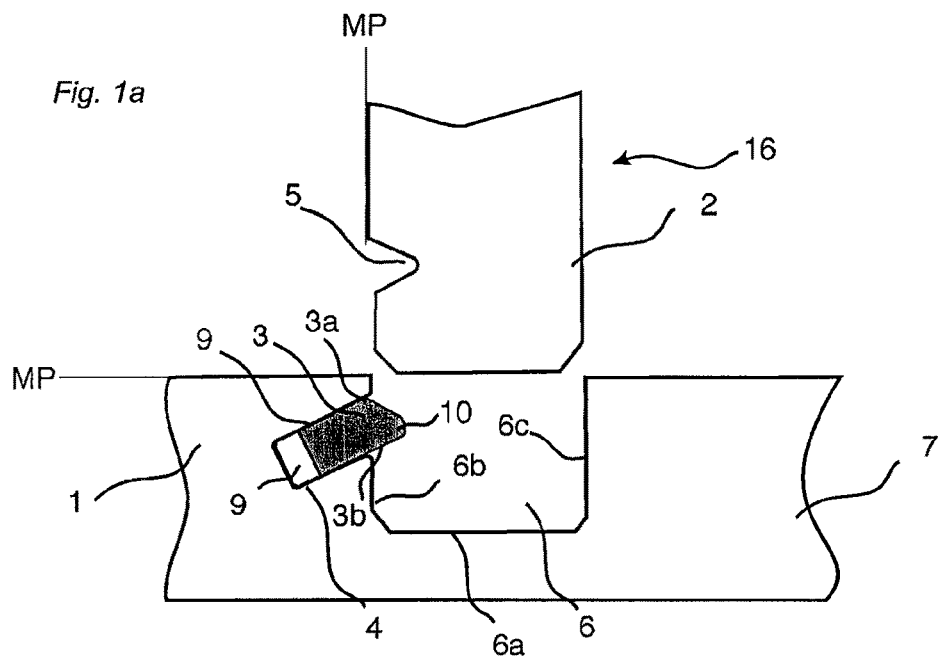
FIGS. 1a-c illustrate a perpendicular snap action of a middle section according to an embodiment of the invention.
Figure 1B:
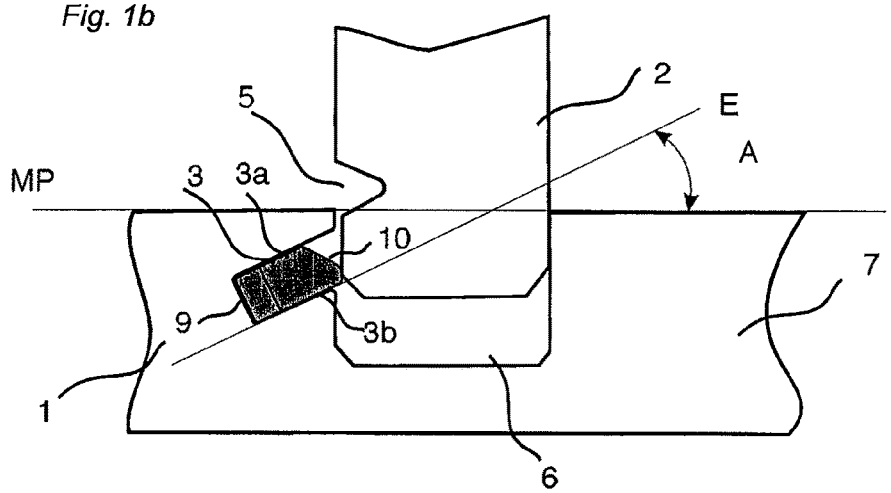
Figure 1C:
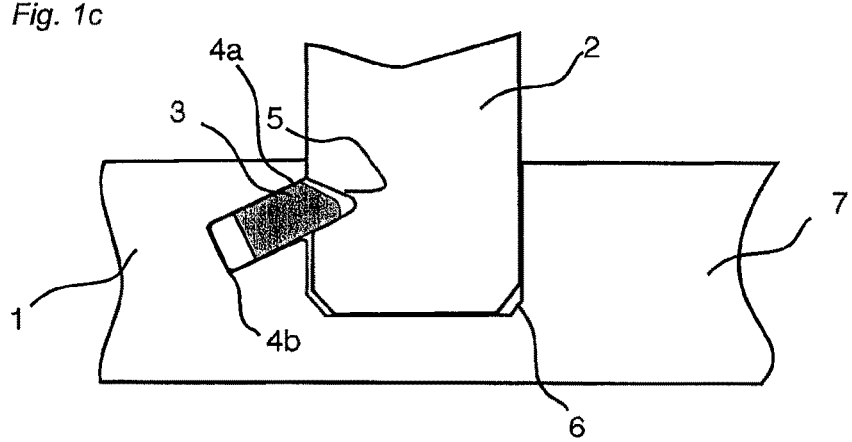

FIGS. 1a-1c show a connection with a perpendicular snap action according to a preferred embodiment of the invention. FIG. 1a shows a first 1 and a second 2 panel. The first panel 1 comprises a groove 6, formed in the panel core 7. The groove comprises a bottom 6a and two opposite groove walls 6b, 6c. The groove is open towards a main plane MP of the first panel 1. An insertion groove 4 is formed in one of the groove walls 6b. The insertion groove 4 is preferably inclined in relation to the main plane MP of the panel such that the opening of the insertion groove 4a is closer to the main plane MP than the inner part 4b. It is preferred that a linear extension E of the insertion groove extends at or more preferably above the opening of the groove 6. This makes it possible to form the insertion groove with large rotating tools and to insert a separate tongue 3 into the groove. The insertion groove is preferably inclined with an angle A of about 10-45 degrees. The insertion groove comprises a flexible tongue 3, which has an inner part 9 and an outer part 10 and preferably two opposite sliding surfaces 3a and 3b between the inner 9 and the outer 10 parts.

FIG. 1b shows how the flexible tongue 3 with its displacement surfaces 3a, 3b is displaced inwardly into the insertion groove 4 when the second panel 2 is inserted into the groove 6 perpendicularly to the first panel 1.

FIG. 1c shows how the flexible tongue 3 is displaced in the insertion groove outwardly into the tongue groove 5 such that the second panel is connected perpendicular and parallel to the first panel with preferably a snap action. The flexible tongue and the tongue groove lock the panels perpendicularly to the main plane MP of the first panel 1. The groove 6 and the edge 16 of the second panel lock the panels parallel to the main plane MP of the first panel 1. The flexible tongue 3 may be locked with pretension into the tongue groove 5.

Figure 2A:
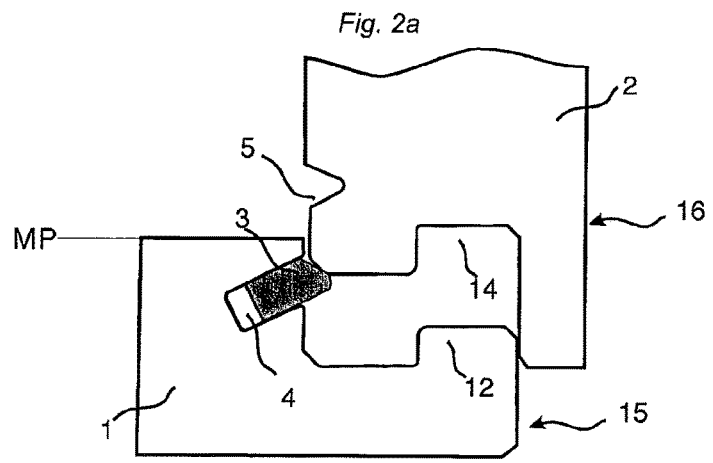
FIGS. 2a-b illustrate a corner section according to an embodiment of the invention.
Figure 2B:
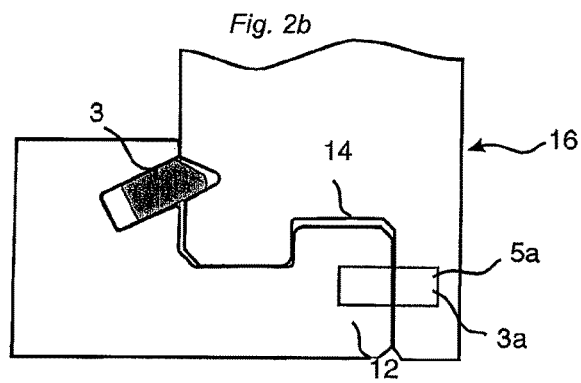

FIGS. 2a and 2b show another preferred embodiment of the invention where the edge 15, of the first panel comprises a locking element 12 and the edge 16 of the second panel comprises a locking groove 14. The locking element and the locking groove locks the panels parallel to the main plane of the first panel. This embodiment may be used to connect corner sections. A tongue 3a and a tongue groove 5a may also be located and formed on the outer part of the locking element 12 and/or in a groove wall of the locking groove 14 as shown in FIG. 2b. There may be a space between the outer part of the locking element 12 and the locking groove, or a play or a tight fit. The insertion groove 4 may be formed in the second panel and the tongue groove 5 in the first panel. The insertion groove and/or the locking surfaces between the flexible tongue and the tongue groove may be inclined or essentially parallel to the main plane MP of the first panel.

Figure 2C:
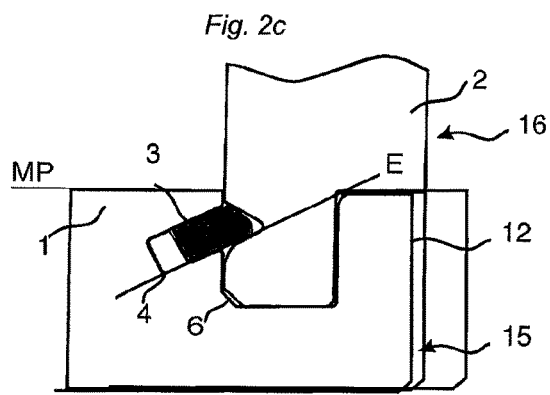
FIGS. 2c-2d illustrate corner section or middle sections according to embodiments of the invention.

FIG. 2c shows an alternative embodiment, which may be used to connect corner sections or middle sections. The edge 15, of the first panel 1, comprises a locking element 12 that in locked position forms an outer free end of the panel. The flexible tongue 3 is displaced inwardly into the insertion groove 4 when the second panel 2 is inserted into the groove 6 perpendicularly to the first panel 1. The inclination of the insertion groove 4 facilitates the insertion of the flexible tongue 3 into the insertion groove 4 during production and locking may be accomplished with lower resistance since the flexible tongue 3 slides inwardly and downwardly during locking. The insertion groove is preferably inclined such that an extension E of its lower part is located at or above the upper part of the locking element 12.

Figure 2D:
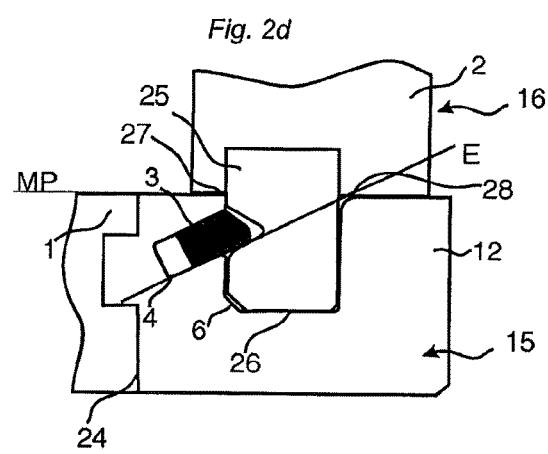

FIG. 2d shows that the second panel 2 may have an outer edge 26 with a smaller thickness than the panel body 2 such that the panel body 2 overlaps one 27 or both parts 27, 28 of the groove opening when the second panel 2 is inserted into the groove 6 of the first panel 1. The first and/or the second panel may comprise separate materials 24, 25 that form an edge or a groove portion of the first or the second panels. A particle board panel may for example be reinforced with solid wood, plywood, HDF and similar wood based materials that are glued or mechanically connected to the panel in order to form at least a part of the locking system. Separate materials may be covered with for example a foil, paper or paint.

Figure 3A:
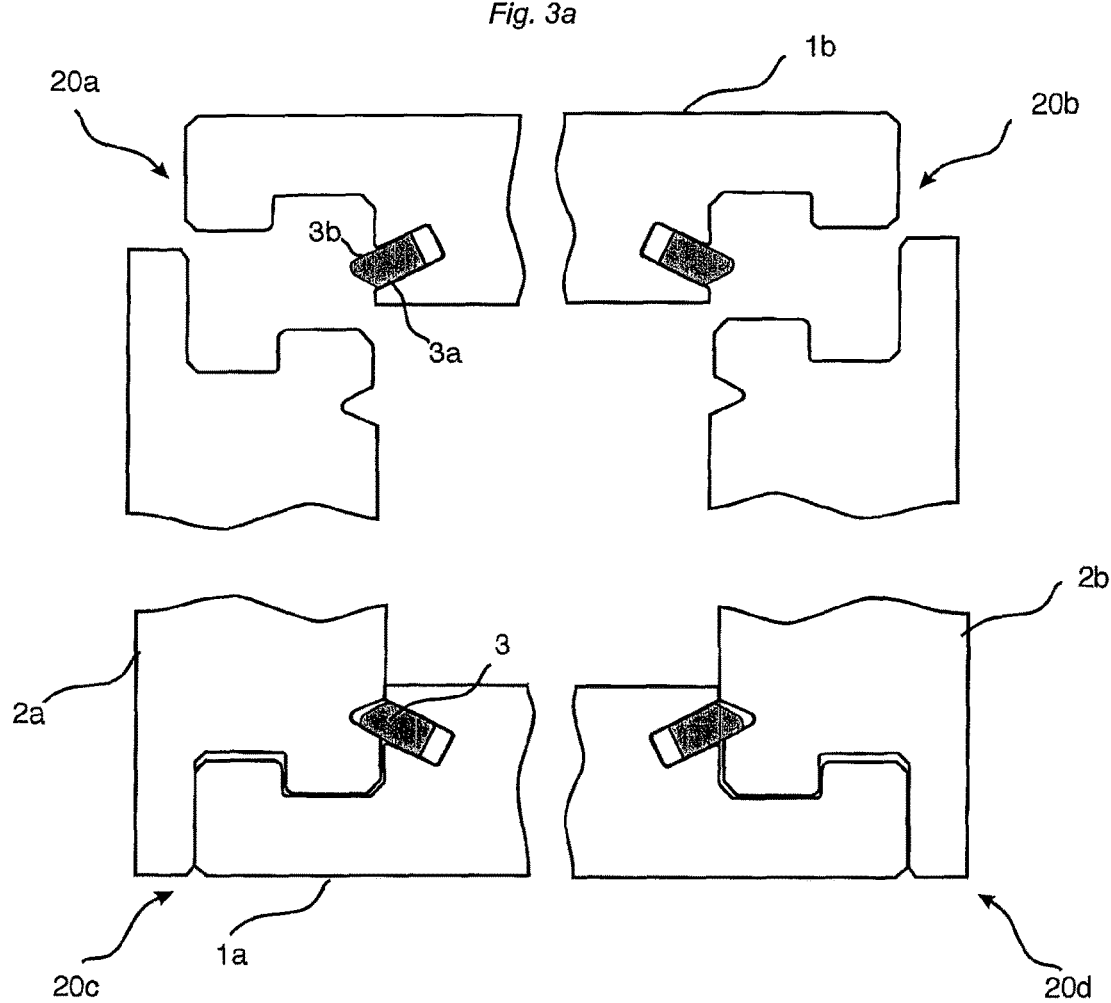
FIGS. 3a-b illustrate locking of four panels and a corner section according to embodiments of the invention.

FIG. 3 shows a connection of four corner sections 20a, b, c, d. Four panels of for example a kitchen cabinet may be connected. A first panel 1a is placed on a floor. A second 2a and a third 2b panel are connected with snapping to the first panel 1a. Finally a fourth panel 1b is connected to the second and third panels.

Figure 3B:
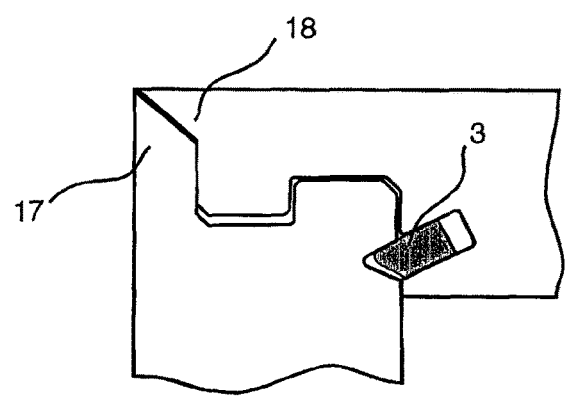

FIG. 3b shows a corner section where the adjacent panel edges 17, 18 are inclined, preferably inwardly and preferably with an angle of about 45 degrees against the main plane of the panels.

Figure 4A:
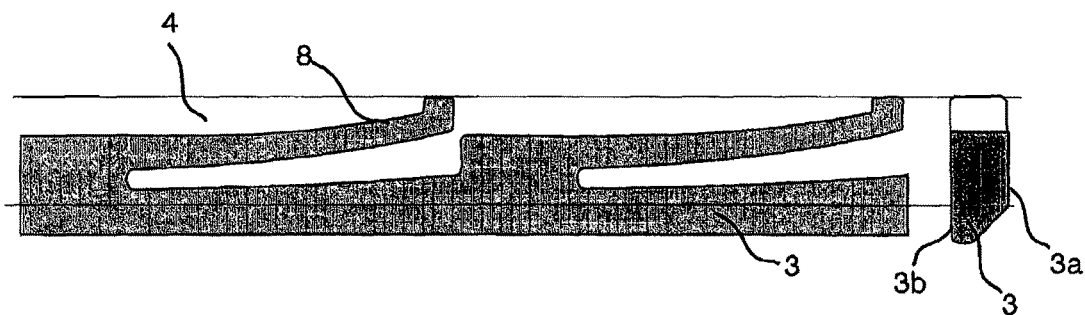
FIGS. 4a-d illustrate a bristle tongue and a bow shaped tongue according to embodiments of the invention.
Figure 4B:
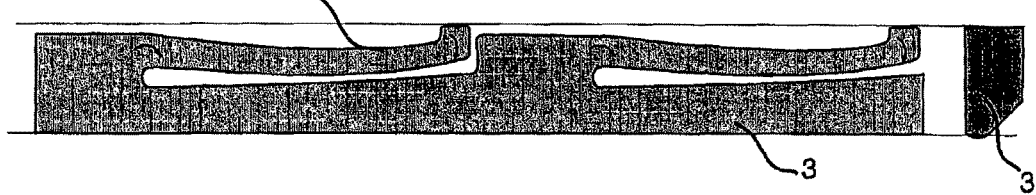
Figure 4C:
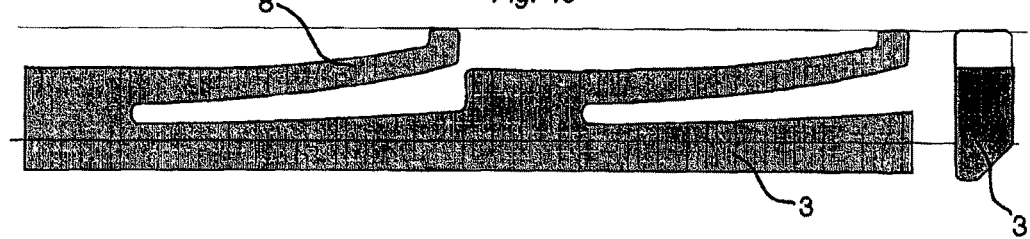

FIGS. 4a-4c show a known flexible bristle tongue 3, which is used to connect floor panels. Such a tongue may be used to connect panels according to embodiments of the invention. The tongue comprises flexible protrusions 8 that bend in the length direction of the tongue and that displace the tongue in the insertion groove during the snap action. FIG. 4a shows the tongue in the outer position prior to locking, FIG. 4b shows the tongue 3 in the inner position during locking, and FIG. 4c shows the tongue 3 in the outer and locked position.

Figure 4D:
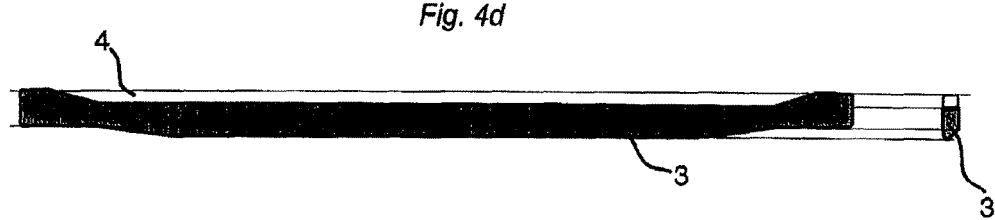

FIG. 4d shows a flexible bow shaped tongue 3 that bends in the length direction.

All known flexible tongues that are used to lock floor panels may be used in embodiments of this invention. Tongues that bend in the length direction are preferred, for example, bristle tongues and bow shaped tongues, as shown in FIGS. 4a and 4d, since such tongues have the advantage that flexibility may be combined with a rigid and strong outer part that creates a strong locking even in rather soft core materials such as particle boards that are generally used as a core in furniture components. It is an advantage if the tongue creates a pretension against the tongue groove in locked position. This gives a stronger locking and eliminates production tolerances especially if the locking surface of the tongue/tongue groove is inclined against the main plane of the first panel. The tongue is preferably formed of an injection moulded plastic material preferably reinforced with glass fibres.

Figure 5A:
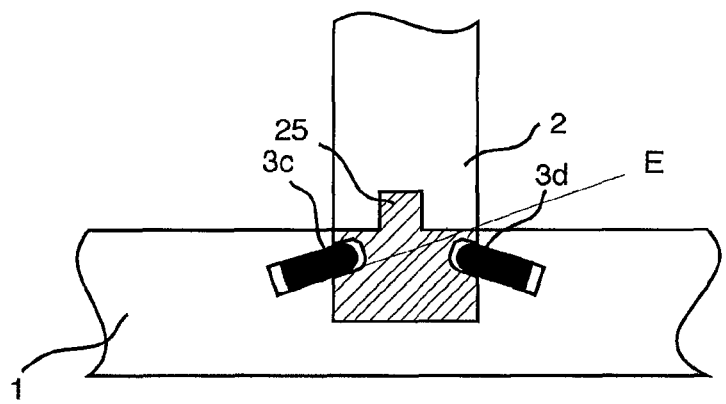
FIGS. 5a-5c illustrate embodiments of the invention.

FIG. 5a shows an embodiment with two tongues 3c, 3d. The edge of the second panel 2 may comprise a separate material 25.

Figure 5B:
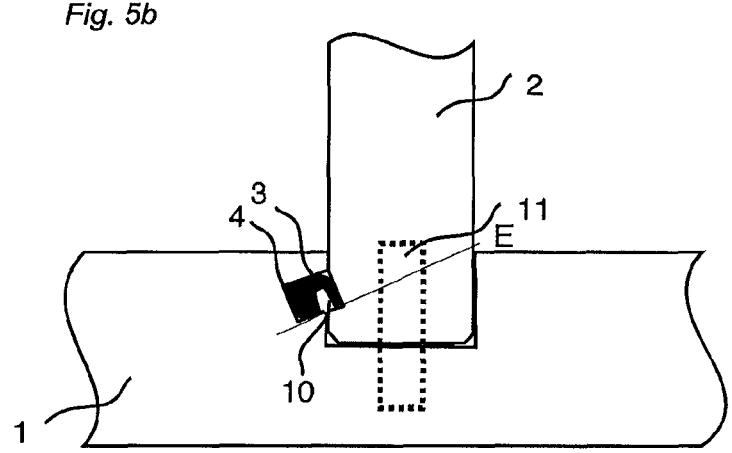

FIG. 5b shows a tongue 3 that comprise an outer part 4 with a snap tab that during snapping is displaced at least partly into an inclined insertion groove 4. The locking system comprises a stabilizing tongue 11 that may be formed in one piece with the core or inserted as a separate element.

Figure 5C:
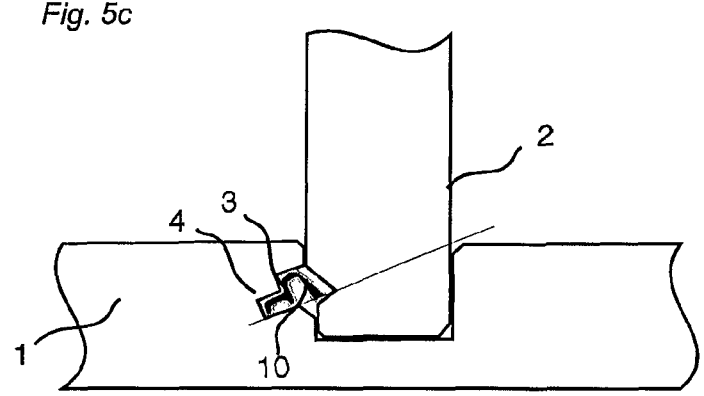

FIG. 5c shows a tongue 3 comprising a snap tab 10 that during snapping is displaced outside the insertion groove 4.

Figure 6A:
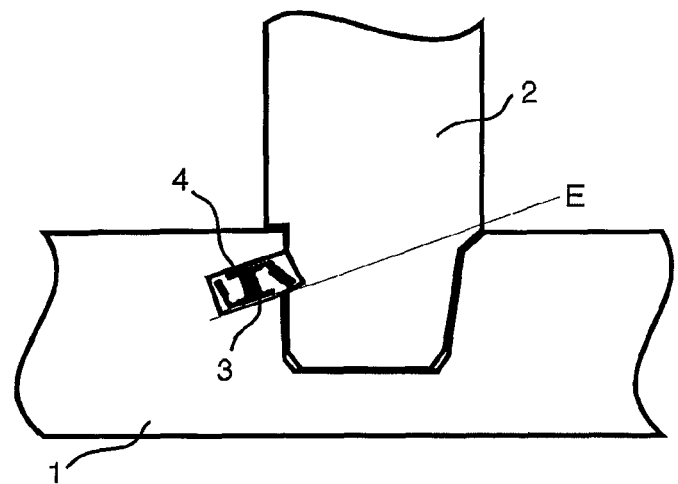
FIGS. 6a-6c illustrate embodiments of the invention.
Figure 6B:
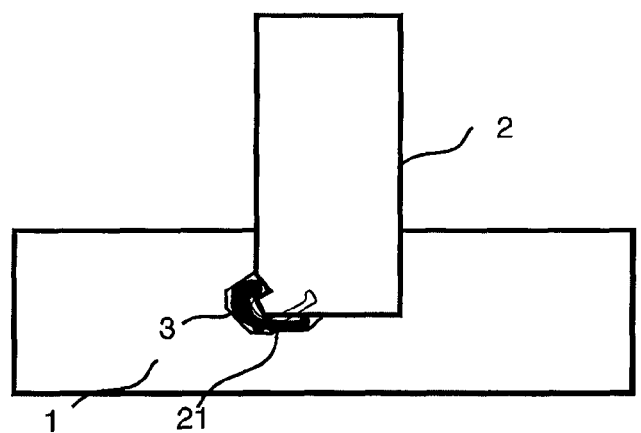

FIG. 6a shows a tongue that comprises an inner and outer flexible part. FIG. 6b shows an embodiment with a turning and snapping tongue 3 comprising a pressing arm 21 that turns and snaps the tongue 3 into a tongue groove.

Figure 6C:
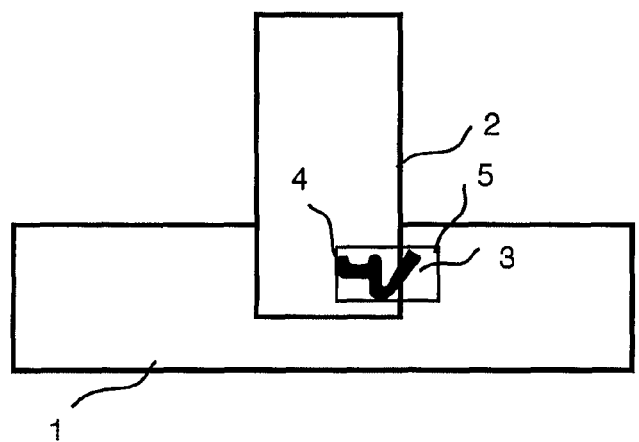

FIG. 6c shows schematically that the insertion groove 4 may be formed in the second panel 2.

Figure 7A:
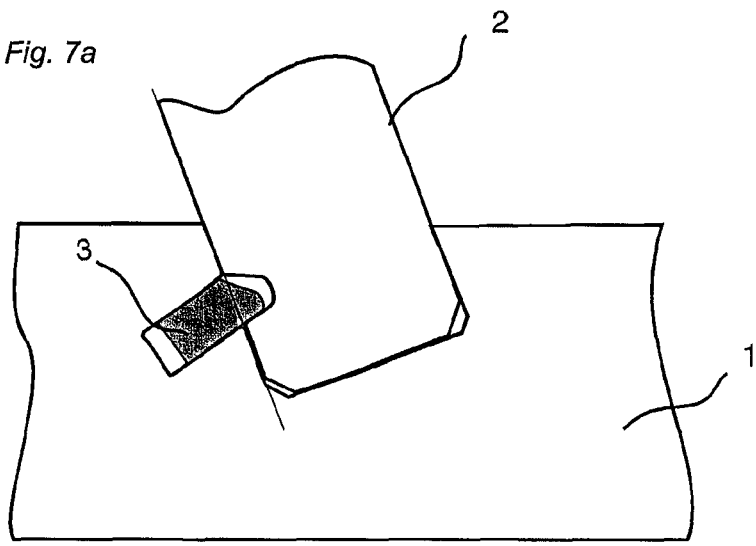
FIGS. 7a-7c illustrate embodiments of the invention.
Figure 7B:
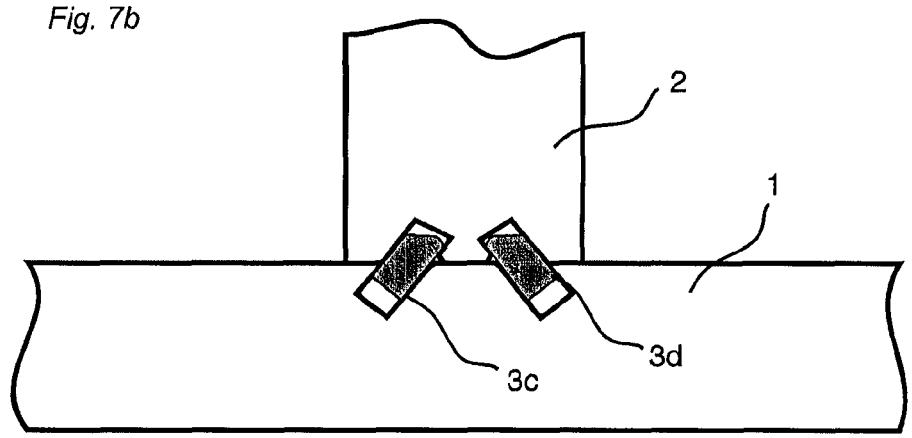
Figure 7C:
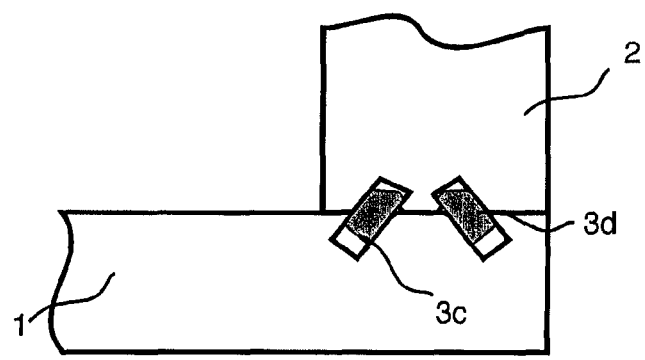

FIGS. 7a-7c show alternative positions of the flexible tongues. FIG. 7a shows that the second panel may be somewhat inclined for example 45-89 degrees against main plane of the first panel. FIG. 7b shows two tongues 3a,3b attached to a middle section of a first panel 1 and FIG. 7c shows a corner section.

Figure 8A:
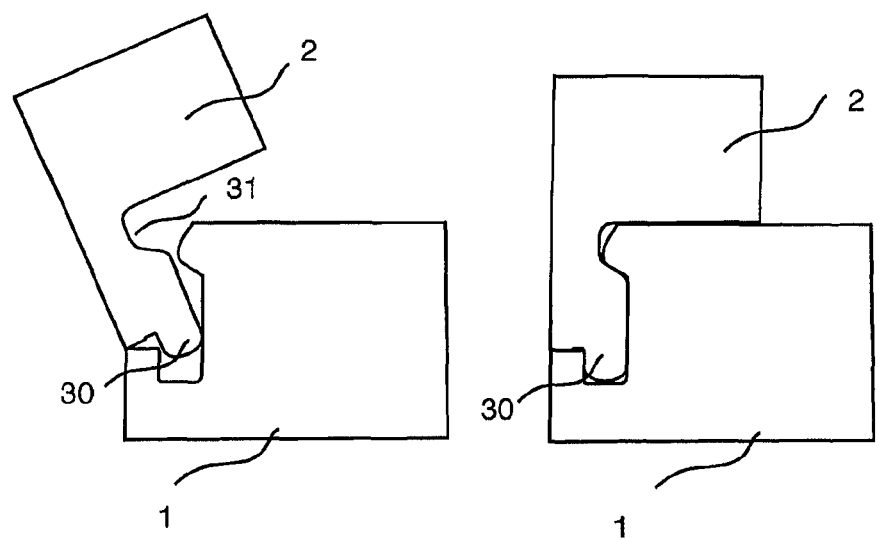
FIGS. 8a-b illustrate an angling connection according to embodiments of the invention.
Figure 8B:
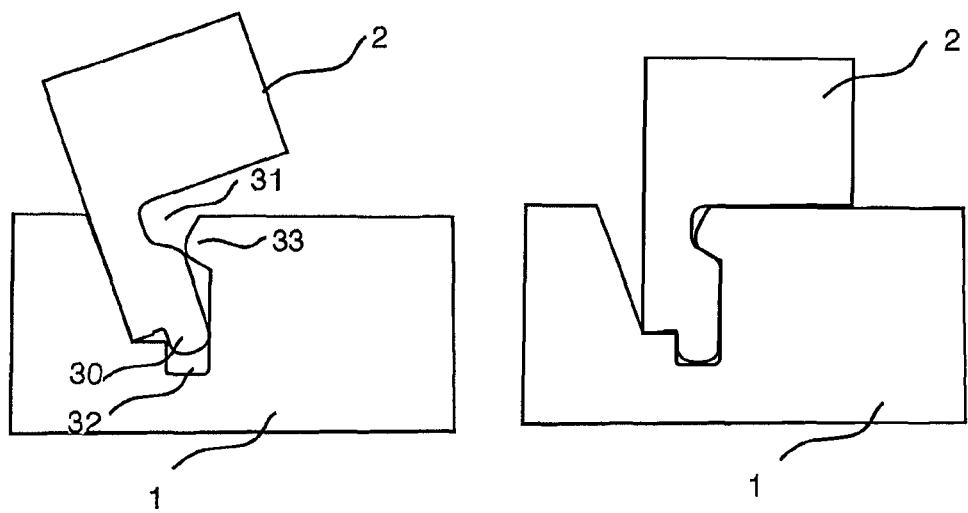

FIGS. 8a and 8b shows that two panels may be angled together according to the generally known principles used in locking systems for flooring. Such angling connection may be combined with all snapping embodiments described above. FIG. 8a shows an angling connection of a corner section and FIG. 8b shows an angling connection of a middle section. The second panel 2 that is angled during connection comprises a tongue 30 and a locking groove 31 that cooperates during locking with a tongue groove 32 and a locking element 33 formed in the first panel.

Figure 9A:
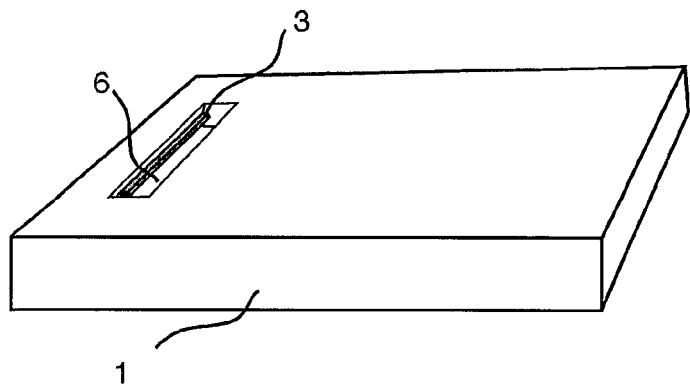
FIGS. 9a-d illustrate a partial groove and a side push tongue according to embodiments of the invention.

All fixation and tongue grooves may be formed over the complete length or with of a panel. They may also be formed as one or several local grooves, which only extend along a part of the panel. Such grooves may be formed in many ways for example with rotating jumping tool heads. Such a local groove 6 is schematically shown in FIG. 9a.

Figure 9B:
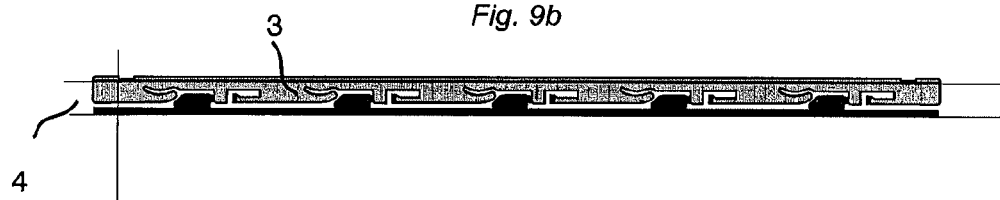
Figure 9C:
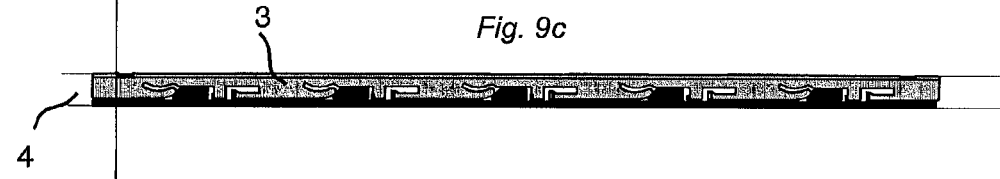
Figure 9D:
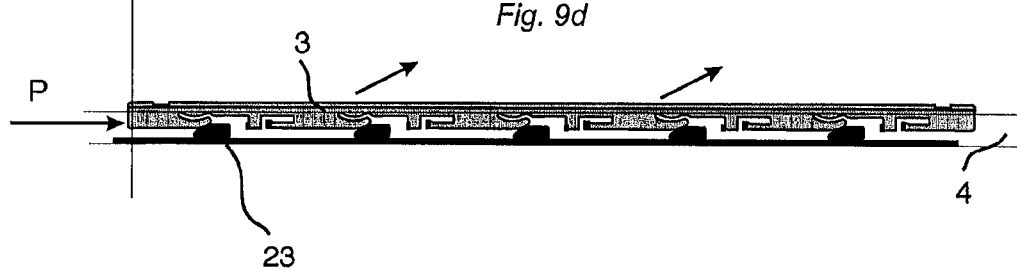

FIGS. 9b-9d show that the so-called side push locking systems may also be used to connect furniture components. Such a tongue 3 that is displaced width a side pressure P along the insertion groove 4 and perpendicularly to the insertion groove into the tongue groove may be used in all embodiments shown above. The perpendicular displacement may be accomplished with wedges 23 or with a fixation groove, which have a depth that varies along the groove. The tongue 3 and the tongue groove may also comprise overlapping protrusion and a locking may be accomplished with a displacement along the insertion groove without any perpendicular displacement into the tongue groove. Such embodiments allow locking with a rigid tongue and no flexible parts are needed.

Figure 10A:
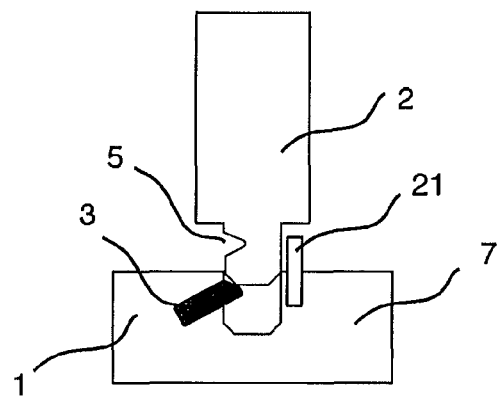
FIGS. 10a-10c illustrate embodiments of the invention.
Figure 10B:
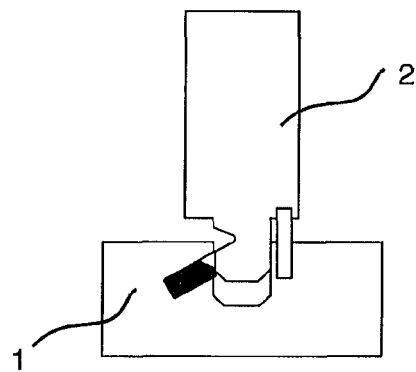
Figure 10C:
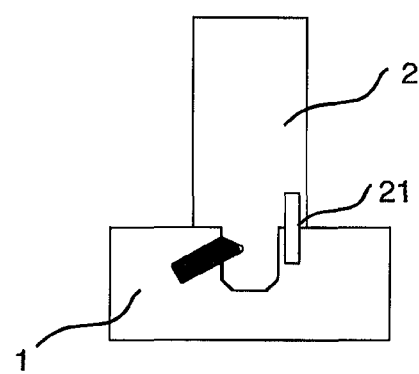

FIGS. 10a-10c show an embodiment of the invention further comprising a plug 21 of e.g. plastic, wood or metal at of the panels 1, 2 inserted into a hole, preferably at the edge of the other panel, The plug and the hole increases the strength of the connection and may be used to position the panels.

Figures 11A, 11B, 11C, 11D:
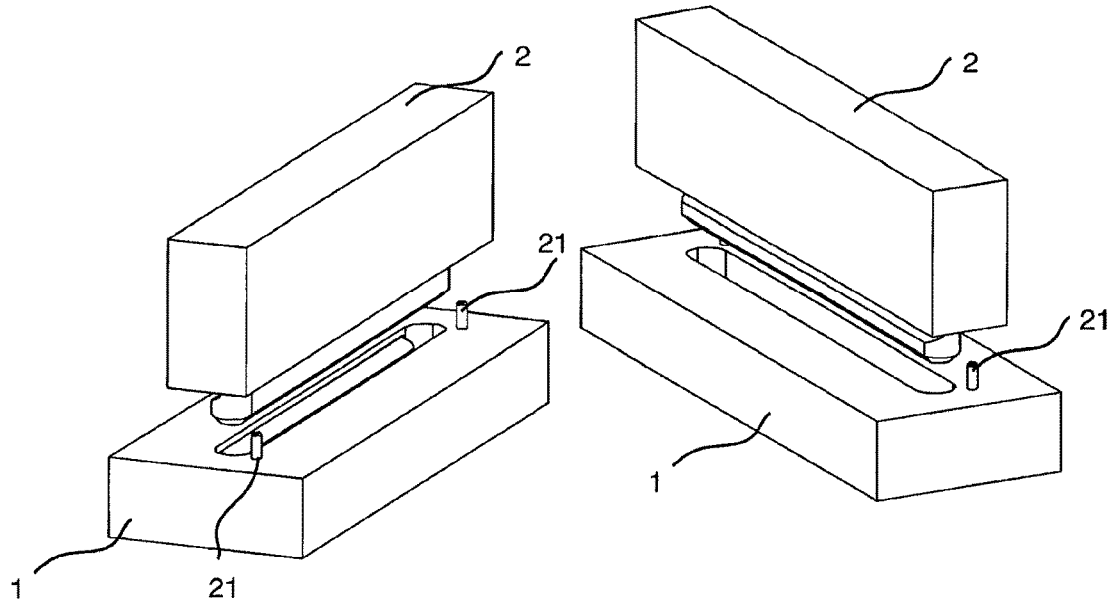
FIG. 11a-11d illustrate embodiments of the invention in a 3d view.

FIG. 11a-11b show the embodiment in FIG. 10a-c in a 3d view at two different angles and FIG. 11c-11d a cross section in a 3d view at two different angles.

EMBODIMENTS OF THE INVENTION

1. A set of panels (1,2) comprising a first (1) and a second panel (2), an edge (16) of the second panel is insertable into a groove (6) of the first panel (1), when the panels are arranged essential perpendicular to each other, to obtain a mechanical connection between the first and the second panel, when the second panel is displaced essentially perpendicularly to the first panel, wherein:
said edge (16) comprises a separate and flexible tongue (3) and said groove (6) comprises a tongue groove (5), or said edge (16) comprises a tongue groove (5) and said groove (6) comprises a separate and flexible tongue (3);

the separate and flexible tongue (3) is insertable into the tongue groove (5) for connecting said panels to each other in a first direction, which is parallel to a main plane (MP) of the first panel;

the edge (16) of the second panel is configured to cooperate with the groove (6) of the first panel for connecting said panels to each other in a second direction, which is parallel to a main plane (MP) of the second panel;

the length direction of the separate and flexible tongue (3) extends parallel with said edge and/or groove;

the groove (6) comprises an opening, two side walls (6b, 6c) and a bottom (6a);

the separate and flexible tongue (3) is arranged in an insertion groove (4);

the separate and flexible tongue has an inner part (9) mounted in the insertion groove (4) and an outer part (10) extending outside an opening of the insertion groove; and the flexible tongue is displaceable inwardly towards a bottom of the insertion groove (4) and outwardly into the tongue groove (5) during locking.

2. The set of panels as recited in embodiment 1, wherein the flexible tongue has two opposite displacement surfaces (3a, 3b) located between the inner and the outer parts, each of the two opposite displacement surfaces of the flexible tongue (3) are displaceable against an upper and a lower wall respectively of the insertion groove during locking, inwardly towards the bottom of the insertion groove (4) and outwardly into the tongue groove (5).

3. The set of panels as recited in embodiment 1 or 2, wherein the said insertion groove (4) is inclined upwards with the opening closer to the main plane (MP) of the panel than the inner part insertion groove (4).

4. The set of panels as recited in any of the preceding embodiments, wherein the insertion groove (4) is inclined such that an extension E of its lower part is located at or above the upper part of the opening of the groove (6).

5. The set of panels as recited in any of the preceding embodiments, wherein the second panel comprises an outer edge with a smaller thickness than the panel body (2) such that the panel body overlaps one or both parts of the groove (6) opening (27, 28) when the second panel (2) is inserted into the groove (6) of the first panel (1).

6. The set of panels as recited in any of the preceding embodiments, wherein the inner part of the tongue (9) comprises one or several flexible protrusions (8) extending in the length direction of the tongue (3).

7. The set of panels as recited in any of the preceding embodiments, wherein the insertion groove (4) is formed in the groove (6) of the first panel (1).

8. The set of panels as recited in any of the preceding embodiments, wherein the insertion groove (4) is inclined in relation to the main plane of the second panel with an angle of about 10-45 degrees.

9. The set of panels as recited in any of the preceding embodiments, wherein the panels comprises at least two flexible tongues separated from each other.

10. The set of panels as recited in any of the preceding embodiments, wherein the groove (6) is formed as a partial groove extending along a part of a panel.

11. The set of panels as recited in any of the preceding embodiments, wherein the panels are provided with a locking element (12) and a locking groove (14) for locking the panels parallel to the main plane (MP) of the first panel (1).

12. The set of panels as recited in any of the preceding embodiments, wherein adjacent outer panel edges (17,18) in a corner portion are inclined inwardly against the main plane (MP) of the panels.

13. The set of panels as recited in any of the preceding embodiments, wherein the tongue (3) is locked with pretension against the tongue groove (5).

14. The set of panels as recited in any of the preceding embodiments, wherein the resilient parts are formed of an injection moulded plastic material.

15. The set of panels as recited in any of the preceding embodiments, wherein the first and/or the second panel comprise separate materials (24, 25) that form an edge or a groove portion.

16. The set of panels as recited in embodiment 15, wherein the separate material is covered with a foil.

The invention claimed is:

1. A set of furniture components provided with a mechanical locking system for locking a first panel and a second panel essentially perpendicularly to each other,
    the mechanical locking system comprising:
        a groove provided in the first panel,
        an edge of the second panel,
        an insertion groove provided in the groove of the first panel or in the edge of the second panel,
        a tongue groove provided in the edge of the second panel or in the groove of the first panel, and
        a separate and flexible tongue provided in the insertion groove,
    wherein the edge of the second panel is configured to be inserted into the groove of the first panel for locking said panels to each other in a direction perpendicular to a main plane of the second panel,
    wherein the separate and flexible tongue is configured to cooperate with the tongue groove for locking said panels to each other in a direction perpendicular to a main plane of the first panel, and
    wherein the mechanical locking system comprises a plug and a hole configured to cooperate with each other, wherein the plug and the hole are entirely spaced from the groove.

2. A set of furniture components according to claim 1, wherein the insertion groove is formed in a side wall of the groove of the first panel.

3. A set of furniture components according to claim 1, wherein the plug comprises plastic, wood or metal.

4. A set of furniture components according to claim 1, wherein the plug is provided in the first panel and wherein the hole is provided in the second panel.

5. A set of furniture components according to claim 1, wherein the mechanical locking system comprises two plugs and two holes, each plug being configured to cooperate with a corresponding hole.

6. A set of furniture components according to claim 1, wherein the plug is provided at a longitudinal end portion of the groove in a locked state of the panels.

7. A set of furniture components according to claim 1, wherein the second panel comprises an outer edge having a smaller thickness than a panel body of the second panel.

8. A set of furniture components according to claim 7, wherein the hole is provided in the panel body.

9. A set of furniture components according to claim 7, wherein the separate and flexible tongue and the plug are provided on opposite sides of the outer edge of the second panel in a locked state of the panels.

10. A set of furniture components according to claim 1, wherein the plug is a stabilizing tongue.

11. A set of furniture components according to claim 10, wherein the stabilizing tongue is formed in one piece with a core of the panels or is formed as a separate element.

12. A set of furniture components according to claim 1, wherein an inner part of the separate and flexible tongue is provided in the insertion groove and wherein an outer part of the separate and flexible tongue extends outside of the insertion groove in a locked state of the panels.

13. A set of furniture components according to claim 1, wherein the separate and flexible tongue is configured to be displaced inwardly towards a bottom of the insertion groove and outwardly into the tongue groove during locking.

14. A set of furniture components according to claim 13, wherein the separate and flexible tongue is configured to be linearly displaced.

15. A set of furniture components according to claim 1, wherein the insertion groove is inclined upwards with an opening closer to the main plane of the first panel than an inner part of the insertion groove.

16. A set of furniture components according to claim 1, wherein the insertion groove is inclined such that a linear extension of a lower part of the insertion groove is located at or above the upper part of the opening of the groove.

17. A set of furniture components according to claim 1, wherein the separate and flexible tongue has two opposite displacement surfaces configured to be displaced together in a common direction against an upper wall and a lower wall of the insertion groove during locking.

18. A set of furniture components according to claim 1, wherein the separate and flexible tongue is configured to be locked with pretension against the tongue groove.

19. A set of furniture components according to claim 1, wherein the groove is provided on a top surface of the first panel at a first location, and the plug or the hole is provided on the top surface of the first panel at a second location, the first location being spaced from the second location.

20. A set of furniture components provided with a mechanical locking system for locking a first panel and a second panel essentially perpendicularly to each other,
the mechanical locking system comprising:
a groove provided in the first panel,
an edge of the second panel,
an insertion groove provided in the groove of the first panel or in the edge of the second panel,
a tongue groove provided in the edge of the second panel or in the groove of the first panel, and
a separate and flexible tongue provided in the insertion groove,
wherein the edge of the second panel is configured to be inserted into the groove of the first panel for locking said panels to each other in a direction perpendicular to a main plane of the second panel,
wherein the separate and flexible tongue is configured to cooperate with the tongue groove for locking said panels to each other in a direction perpendicular to a main plane of the first panel, and
wherein the mechanical locking system comprises a plug and a hole configured to cooperate with each other, wherein the plug is a stabilizing tongue, wherein the stabilizing tongue and the hole are configured to cooperate in the groove of the first panel,
wherein the insertion groove is inclined upwards with an opening closer to the main plane of the first panel than an inner part of the insertion groove.

* * * * *